United States Patent
Li et al.

(10) Patent No.: US 11,614,413 B2
(45) Date of Patent: Mar. 28, 2023

(54) BACK SCATTERING INSPECTION SYSTEM AND BACK SCATTERING INSPECTION METHOD

(71) Applicants: TSINGHUA UNIVERSITY, Beijing (CN); NUCTECH COMPANY LIMITED, Beijing (CN); NUCTECH (BEIJING) COMPANY LIMITED, Beijing (CN)

(72) Inventors: Jianmin Li, Beijing (CN); Li Zhang, Beijing (CN); Yuanjing Li, Beijing (CN); Zhiqiang Chen, Beijing (CN); Hao Yu, Beijing (CN); Shangmin Sun, Beijing (CN); Bicheng Liu, Beijing (CN); Weizhen Wang, Beijing (CN); Dongyu Wang, Beijing (CN); Yuan Ma, Beijing (CN); Yu Hu, Beijing (CN); Chunguang Zong, Beijing (CN)

( * ) Notice: Subject to any disclaimer, the term of this patent is extended or adjusted under 35 U.S.C. 154(b) by 10 days.

(21) Appl. No.: 17/255,968

(22) PCT Filed: Jan. 3, 2020

(86) PCT No.: PCT/CN2020/070317
§ 371 (c)(1),
(2) Date: Dec. 23, 2020

(87) PCT Pub. No.: WO2020/140982
PCT Pub. Date: Jul. 9, 2020

(65) Prior Publication Data
US 2021/0364455 A1 Nov. 25, 2021

(30) Foreign Application Priority Data
Jan. 4, 2019 (CN) .......................... 201910009048.1

(51) Int. Cl.
*G01N 23/20008* (2018.01)
*G01N 23/203* (2006.01)

(52) U.S. Cl.
CPC ..... *G01N 23/20008* (2013.01); *G01N 23/203* (2013.01); *G01N 2223/3303* (2013.01)

(58) Field of Classification Search
CPC ........ A61B 6/102; H01J 37/02; H01J 37/023; H01J 37/16; H01J 2237/02;
(Continued)

(56) References Cited

U.S. PATENT DOCUMENTS 6,459,764 B1 * 10/2002 Chalmers ............. G01V 5/0041
378/88
7,769,133 B2 * 8/2010 Carver ................. G01V 5/0041
378/57
(Continued)

FOREIGN PATENT DOCUMENTS

CN 104101910 A 10/2014
CN 105784737 A 7/2016
(Continued)

*Primary Examiner* — Jurie Yun
(74) *Attorney, Agent, or Firm* — Kilpatrick Townsend & Stockton, LLP (57) ABSTRACT

The present disclosure provides a back scattering inspection system and a back scattering inspection method. The back scattering inspection system includes a frame and a back scattering inspection device. The rack includes a track arranged vertically or obliquely relative to the ground, and a space enclosed by the track forms an inspection channel; and the back scattering inspection device includes a back scattering ray emitting device and a back scattering detector, and the back scattering inspection device is movably disposed on the track for inspecting an inspected object passing through the inspection channel. The back scattering inspec-
(Continued)

tion system can perform back scattering inspection on a plurality of surfaces of the inspected object.

16 Claims, 8 Drawing Sheets

(58) Field of Classification Search
CPC ......... H01J 2237/024; H01J 2237/0245; H01J 2237/06; H01J 2237/061; H01J 2237/15; H01J 2237/1501–1503; H01J 2237/1505; H01J 2237/1506; H01J 2237/20; H01J 2237/202; H01J 2237/25407; H01J 2237/248; H05G 1/02; H05G 1/04; H05G 1/20; G01N 21/47; G01N 2021/4704; G01N 2021/4709; G01N 23/20; G01N 23/20008; G01N 23/203; G01N 2291/269; G01N 2223/05; G01N 2223/053; G01N 2223/30; G01N 2223/301; G01N 2223/308; G01N 2223/32; G01N 2223/321; G01N 2223/33; G01N 2223/3303; G01N 2223/3308; G01N 2223/427
See application file for complete search history.

(56) References Cited

U.S. PATENT DOCUMENTS

| | | |
|---|---|---|
| 2010/0327174 A1 | 12/2010 | Edwards et al. |
| 2011/0103548 A1 | 5/2011 | Bendahan |
| 2012/0148020 A1* | 6/2012 | Arroyo, Jr. .......... G01V 5/0016 378/57 |
| 2012/0148026 A1 | 6/2012 | Safai |
| 2015/0323477 A1 | 11/2015 | Edwards et al. |
| 2016/0003965 A1* | 1/2016 | Chen ................... G01V 5/0025 378/87 |
| 2017/0315067 A1* | 11/2017 | Mandrake ............ G01N 23/203 |

FOREIGN PATENT DOCUMENTS

| | | |
|---|---|---|
| CN | 206056502 U | 3/2017 |
| CN | 108508049 A | 9/2018 |
| CN | 109613031 A | 4/2019 |
| EP | 2963454 A1 | 1/2016 |
| EP | 2963455 A1 | 1/2016 |
| EP | 3173775 A1 | 5/2017 |
| EP | 3236294 A2 | 10/2017 |
| JP | 2008180651 A | 8/2008 |
| WO | 2004010127 A1 | 1/2004 |

* cited by examiner

BACK SCATTERING INSPECTION SYSTEM AND BACK SCATTERING INSPECTION METHOD

CROSS-REFERENCES TO RELATED APPLICATIONS

The present disclosure is a national phase application of International Application No. PCT/CN2020/070317, filed on Jan. 3, 2020, which claims the priority of Chinese Application No. 201910009048.1, filed in the Chinese Patent Office on Jan. 4, 2019, the entire contents of which are herein incorporated by reference.

FIELD

The present disclosure relates to the field of radiation inspection, and in particular, to a back scattering inspection system and a back scattering inspection method.

BACKGROUND

Figure 1:
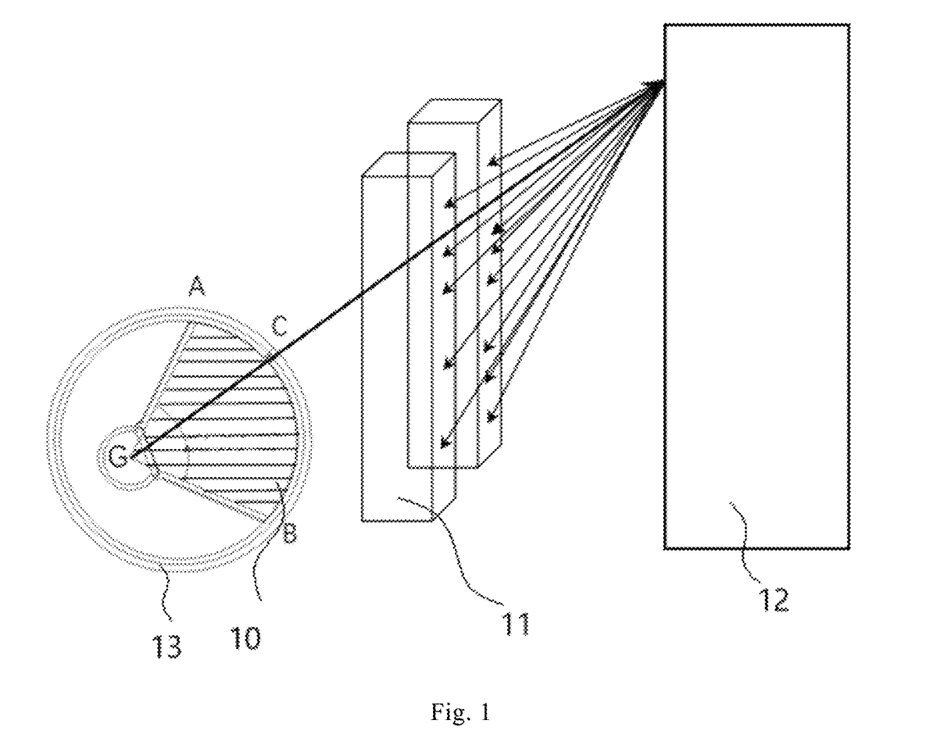
FIG. 1 is a structural schematic diagram of a back scattering inspection system in the prior art.

The commonly used X-ray back scattering imaging technology mainly uses a flying spot device to generate spatially changing pen-shaped X-ray beam current to scan an inspected object 12 point by point. In a back scattering inspection system in the prior art as shown in FIG. 1, G represents a beam exit point of an X-ray machine, a beam limitation hole C is located at the edge of a flywheel 13, and an collimation slit for collimating X-rays is located on a side face of a fan-shaped box 10. The X-rays can pass through a fan-shaped arc edge of the fan-shaped box 10, and the X-rays cannot pass through other edges of the fan-shaped box 10 excluding the fan-shaped arc edge, that is, point-shaped X-rays are emitted within a range from a point A to a point B. When the beam limitation hole C passes round the fan-shaped box, the point-shaped X-rays through the beam limitation hole C can be emitted from the fan-shaped box 10 to the inspected object 12. The back scattering detector 11 on the same side as a flying spot ray source receives the X-rays scattered by the inspected object, and a series of digital image signals are generated in real time through an image acquisition and analysis system.

SUMMARY

A first aspect of the present disclosure discloses a back scattering inspection system including:

a frame, including a track arranged vertically or obliquely relative to the ground, and a space enclosed by the track forms an inspection channel; and a back scattering inspection device, including a back scattering ray emitting device and a back scattering detector, and the back scattering inspection device is movably disposed on the track for inspecting an inspected object passing through the inspection channel.

In some embodiments, the back scattering ray emitting device is disposed in such a way that a scanning direction of a pen-shaped ray beam emitted by the same is parallel to an extension direction of the inspection channel.

In some embodiments, the back scattering inspection system includes a first driving device in driving connection with the back scattering inspection device, and the first driving device is configured to drive the back scattering inspection device to move on the track.

In some embodiments, the track is a polygonal line-shaped track, a curved track, or a track formed by a combination of a straight track and a curved track.

In some embodiments, the track is a U-shaped track, an arc-shaped track, or a circular track.

In some embodiments, the back scattering inspection system further includes a second driving device, and the second driving device is configured to drive the back scattering inspection device to rotate around a direction of the movement of the back scattering inspection device on the track.

In some embodiments, the back scattering inspection system further includes a license plate identification system, and when the inspected object is a vehicle, the license plate recognition system is configured to identify license plate information of the vehicle.

In some embodiments, the back scattering inspection system further includes a positioning sensor, configured to detect a position of the inspected object relative to the track.

In some embodiments, the back scattering inspection system further includes a laser radar device, configured to inspect a surface of the inspected object.

In some embodiments, the back scattering inspection system further includes an anti-collision system, and the anti-collision system includes an anti-collision sensor disposed on the frame for detecting the distance between the track and the inspected object, and an alarm system in signal connection with the anti-collision sensor.

In some embodiments, the frame is a movable frame.

A second aspect of the present disclosure further discloses a back scattering inspection method using the back scattering inspection system according to the first aspect of the present disclosure, including: when the back scattering inspection device executes scanning inspection, causing the back scattering inspection device to move along the track.

In some embodiments, a scanning direction of a pen-shaped ray beam emitted by the back scattering ray emitting device is parallel to an extension direction of the inspection channel.

In some embodiments, the back scattering inspection method includes: causing the back scattering inspection device to rotate around the direction of the movement of the back scattering inspection device on the track while moving along the track.

In some embodiments, the back scattering inspection method includes: keeping an angle of the back scattering inspection device relative to the direction of the movement of the back scattering inspection device on the track unchanged while moving along the track, and performing the next scanning after causing the back scattering inspection device to rotate an angle around the direction of the movement of the back scattering inspection device on the track when moving to a tail end of the track.

In some embodiments, the back scattering inspection method further includes: inspecting whether the surface of the object is damaged.

In some embodiments, the back scattering inspection method further includes: detecting the distance between the track and the inspected object, and issuing an alarm when the distance between the inspected object and the track is less than a safe distance.

In some embodiments, the back scattering inspection method further includes: after inspecting a part of the inspected object in the extension direction of the inspection channel, changing the position of the inspected object relative to the frame along the extension direction of the inspection channel, and inspecting another part of the inspected object.

Based on the back scattering inspection system provided by the present disclosure, by disposing the track arranged vertically or obliquely relative to the ground, during the process of the back scattering inspection device moving on the track, back scattering inspection is performed on a plurality of surfaces of the inspected object in the inspection channel formed by the space enclosed by the track.

The back scattering inspection method based on the back scattering inspection system provided by the present disclosure can also have corresponding beneficial effects.

Other features and advantages of the present disclosure will become clear from the following detailed description of exemplary embodiments of the present disclosure with reference to the drawings.

BRIEF DESCRIPTION OF THE DRAWINGS

The drawings described herein are used for providing a further understanding of the present disclosure and constitute a part of the present application. Exemplary embodiments of the present disclosure and the description thereof are used for explaining the present disclosure, but do not constitute an improper limitation to the present disclosure. In the drawings.

DETAILED DESCRIPTION OF THE DISCLOSURE

The embodiments of the present disclosure will be shown below, in combination with the drawings in the embodiments of the present disclosure. Apparently, the embodiments described below are merely a part, but not all, of the embodiments of the present disclosure. The following description of at least one exemplary embodiment is merely illustrative and is in no way used as any limitation to the present disclosure and its application or use.

The relative arrangement of components and steps, numerical expressions and numerical values set forth in these embodiments do not limit the scope of the present disclosure, unless specifically stated otherwise. At the same time, it should be understood that, for the convenience of description, the dimensions of various parts shown in the drawings are not drawn according to the actual proportional relationship. Techniques, methods and equipment in the relevant art may not be discussed in detail, but where appropriate, the techniques, methods and equipment should be considered as a part of the authorized specification. In all examples shown and discussed herein, any specific value should be construed as exemplary only and not as a limitation. Therefore, other examples of the exemplary embodiments may have different values. It should be noted that similar reference signs and letters indicate similar items in the following drawings, so once a certain item is defined in one drawing, it does not need be discussed further in the subsequent drawings.

Figure 2:
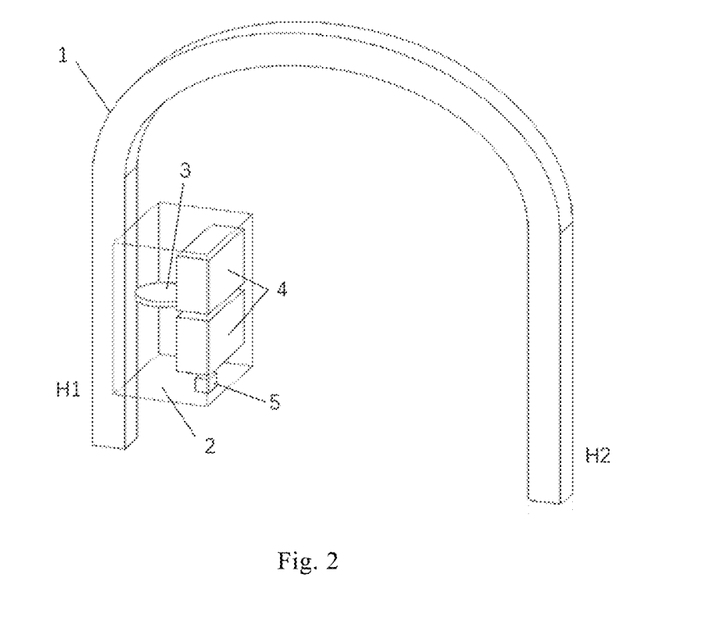
FIG. 2 is a structural schematic diagram of a back scattering inspection system at one inspection state in some embodiments of the present disclosure.
Figure 3:
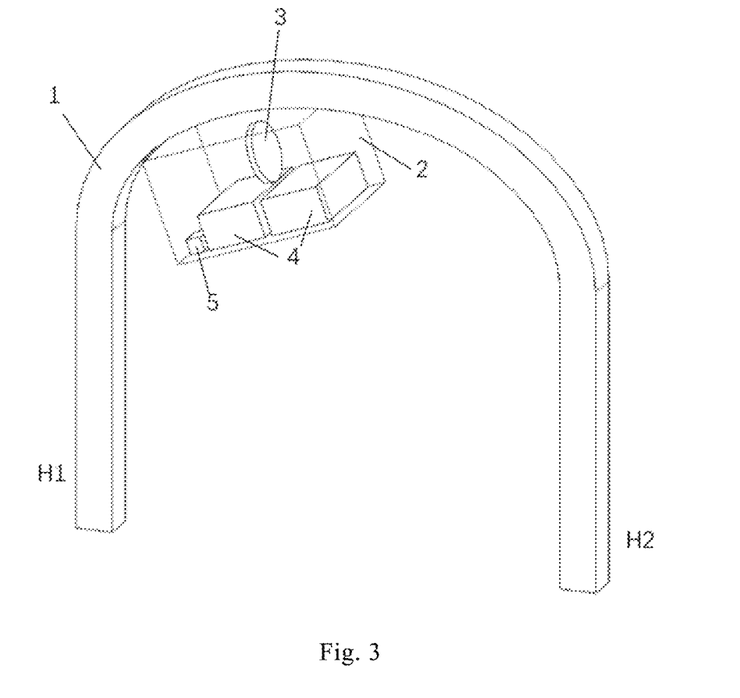
FIG. 3 is a structural schematic diagram of the back scattering inspection system at another inspection state in some embodiments of the present disclosure.

As shown in FIG. 2 to FIG. 3, the back scattering inspection system 100 of the embodiment of the present disclosure includes a frame 1 and a back scattering inspection device 2.

The frame 1 includes a track arranged vertically or obliquely relative to the ground, and a space 101 enclosed by the track 104 forms an inspection channel. The back scattering inspection device 2 includes a back scattering ray emitting device 3 and a back scattering detector 4, and the back scattering inspection device 2 is movably disposed on the track 104 for inspecting an inspected object 6 passing through the inspection channel.

The back scattering ray emitting device 3 can be a flying spot device with a rotatable beam limitation hole as described in the background, and The back scattering ray emitting device 3 can also be other kinds of flying spot devices which swings back and forth to form back scattering scanning rays. The back scattering detector 4 and the back scattering ray emitting device 3 are located on the same side of the inspected object 6, and the back scattering detector 4 is configured to receive rays scattered by the inspected object 6, so that a back scattering inspection image of the inspected object 6 can be formed.

The track 104 is arranged vertically or obliquely relative to the ground, that is, the track 104 has a certain height in a vertical direction, and not all sections of the track 104 contact the ground. The track is a nonlinear track. The track 104 can be a polygonal line-shaped track, a curved track, or a track formed by a combination of a straight track and a curved track. The track 104 is, for example, a U-shaped track, an arc-shaped track, or a circular track.

As shown in FIG. 2 and FIG. 3, the space enclosed by the track forms the inspection channel, that is, the track 104 forms a shape that is enclosed or semi-enclosed to form the space, and the space is used as the inspection channel to perform back scattering inspection on the inspected object 6. The back scattering inspection device 2 can move on the track. The form of the semi-enclosed track is, for example, the aforementioned U-shaped track (gate-shaped track), an L-shaped track, a J-shaped track and other non-closed tracks, and the form of the fully closed track is, for example, a circular track, a polygon track and other closed tracks. The track 104 of the present disclosure can be formed by processing a linear track in bending, curving, tailor welding and other manners.

The back scattering inspection device 2 moves along the track when performing back scattering inspection on the inspected object 6 located in the inspection channel, so the back scattering inspection device 2 can perform scanning inspection on a plurality of surfaces of the inspected object 6. For example, in the embodiment shown in FIG. 2 and FIG. 3, the frame 1 is a U-shaped frame, the track is also a U-shaped track disposed on the frame 1. When a vehicle serving as the inspected object 6 is parked in the inspection channel for inspection, as the back scattering inspection device 2 moves onto the track at a left side of the frame 1 as shown in FIG. 2, a back scattering scan inspection can be performed on a left side of the vehicle located in the inspection channel, for example, a left vehicle door part; as the back scattering inspection device 2 moves onto the track at a top side of the frame 1 as shown in FIG. 3, the back scattering scan inspection can be performed on a top of the vehicle located in the inspection channel, for example, a roof part; and as the back scattering inspection device 2 moves onto the track at a right side of the frame 1 as shown in FIG. 3, the back scattering scan inspection can be performed on a right side of the vehicle located in the inspection channel, for example, a right vehicle door part.

According to the back scattering inspection system 100 provided by the embodiment, by disposing the track arranged vertically or obliquely relative to the ground, during the process of the back scattering inspection device 2 moving on the track, back scattering inspection is performed on the plurality of surfaces of the inspected object 6 located in the inspection channel formed by the space enclosed by the track, which is conducive to increasing the inspection range of the back scattering inspection system 100 and improving the accuracy of the back scattering inspection.

Figure 4:
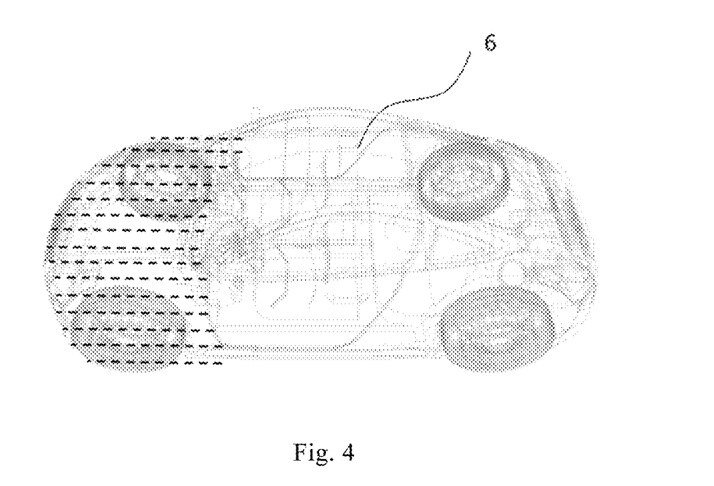
FIG. 4 is a schematic diagram of a scanning trajectory of the back scattering inspection system on the surface of an inspected object in some embodiments of the present disclosure.

In some embodiments, the back scattering ray emitting device 3 is disposed in such a way that a scanning direction C1 of a pen-shaped ray beam 105 emitted by it is parallel to an extension direction B1 of the inspection channel. As shown in FIG. 4, the pen-shaped ray beam emitted by the back scattering ray emitting device 3 scans the inspected object 6 in one direction, a scanning trajectory on the inspected object 6 forms a scanning straight line (as shown by a dotted line in FIG. 4), and meanwhile, the back scattering ray emitting device 3 moves, the scanning straight line translates according to a movement direction, so that the back scattering ray emitting device 3 can form a scanning surface on the surface of the inspected object 6. To form the scanning surface, it is only necessary that the scanning straight line is not parallel to the movement direction of the back scattering ray emitting device 3 and intersects with the movement direction. In the present embodiment, the scanning direction of the pen-shaped ray beam is parallel to the extension direction of the inspection channel, which is conducive to make the movement direction of the back scattering inspection device 2 perpendicular to or form a large angle approaching to 90 degrees with the scanning direction of the pen-shaped ray beam, therefore which is conducive to increasing the scanning area of the back scattering inspection.

In some embodiments, the back scattering inspection system 100 includes a first driving device 81 in driving connection with the back scattering inspection device 2, and the first driving device 81 is configured to drive the back scattering inspection device 2 to move on the track. The first driving device 81 can include a driving wheel disposed on the back scattering inspection device 2 to cooperate with the track, and a power device disposed on the back scattering inspection device 2 to drive the driving wheel to move on the track, for example, a motor.

Figure 11:
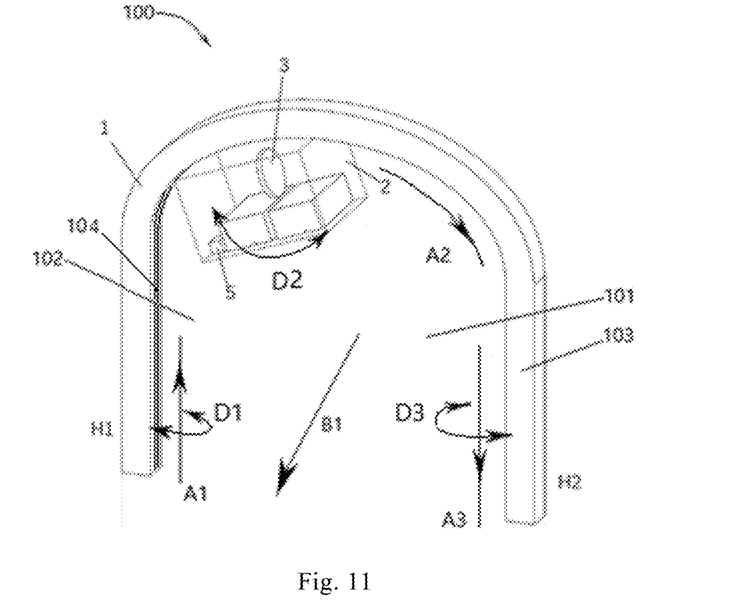
FIG. 11 is a structural schematic diagram of a back scattering inspection system at another inspection state in some embodiments of the present disclosure.
Figure 12:
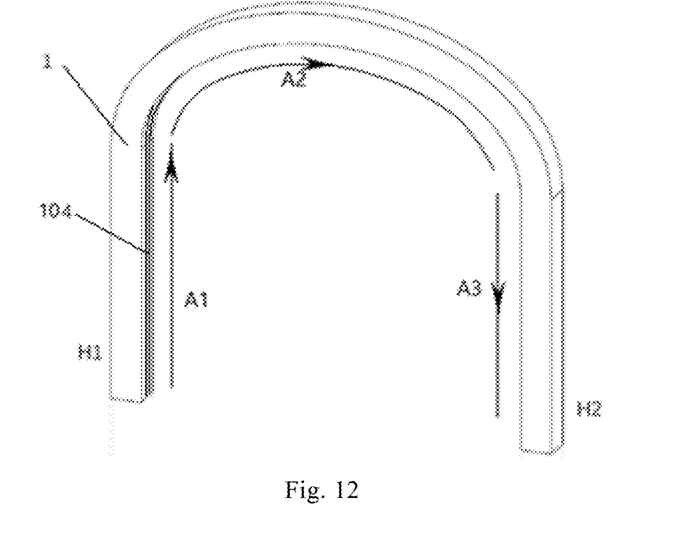
FIG. 12 is a structural schematic diagram of a frame in some embodiments of the present disclosure.
Figure 13:
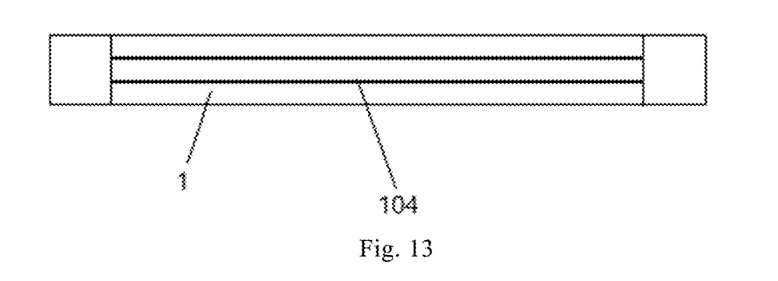
FIG. 13 is a bottom view structural schematic diagram of the frame shown in FIG. 12.

In some embodiments, the back scattering inspection system 100 further includes a second driving device 82, and the second driving device 82 is configured to drive the back scattering inspection device 2 to rotate around the direction (A1, A2, A3) of the movement of the back scattering inspection device on the track (The movement of the back scattering inspection device 2 on the track from one end to the other end is in the direction (A1, A2, A3) shown in FIG. 11 and FIG. 12, but while the back scattering inspection device reaches the other end of the track and returns to the original position, the direction of the movement of the back scattering inspection device 2 on the track will be opposite to the direction (A1, A2, A3) shown in FIG. 11 and FIG. 12. As is shown in FIG. 11, when the back scattering inspection device 2 is located at the current position of the frame shown in the figure, the back scattering inspection device 2 driven by the second driving device 82 rotates in a direction D2, and when the back scattering inspection device 2 moves to a position H2 of the frame, the back scattering inspection device 2 driven by the second driving device 82 rotates in a direction D3, and when the back scattering inspection device 2 moves to a position H1 of the frame, the back scattering inspection device 2 driven by the second driving device 82 rotates in a direction D1. For example, a base hinged with the back scattering inspection device 2 can be configured to cooperate with the track and move relative to the track, and then, a device such as a gear, a motor and the like is disposed to drive the back scattering inspection device 2 to rotate along the direction of the movement of the back scattering inspection device on the track. Due to the configuration, the back scattering scanning angle of the back scattering inspection device 2 can be adjusted, increasing the scanning range of the back scattering inspection device 2. For example, in the embodiment shown in FIG. 2 and FIG. 3, when a vehicle serving as the inspected object 6 is located in the inspection channel, the scanning range can be extended to the front and rear ends of the vehicle by rotating the back scattering inspection device 2 to increase the scanning area.

In some embodiments, as shown in FIG. 2 and FIG. 3, the back scattering inspection system 100 further includes a laser radar device 5, configured to inspect a surface of the inspected object 6. The laser radar device 5 can inspect whether the surface of the inspected object 6 is damaged, and provide auxiliary information for judging and analyzing a back scattering inspection result of the back scattering inspection device 2.

In some embodiments, the back scattering inspection system 100 further includes an anti-collision system 84, the anti-collision system 84 includes an anti-collision sensor 841 disposed on the frame 1 for detecting the distance between the track and the inspected object 6, and an alarm system 842 in signal connection with the anti-collision sensor 841. The configuration helps to prevent the collision between the inspected object and the back scattering inspection system 100 during the back scattering inspection. When the distance between the back scattering inspection system 100 and the inspected object is less than a safe distance, for example, when the distance between the frame 1 or the back scattering inspection device 2 and the inspected object 6 is too small, the alarm system issues an alarm, and the alarm can include prompt tone, as well as automatic suspension of the operation of the back scattering inspection system 100.

Figure 5:
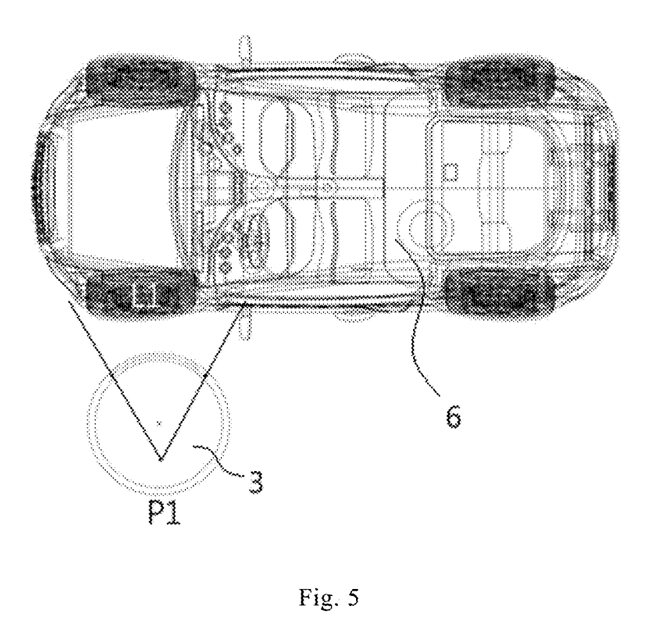
FIG. 5 to FIG. 8 are schematic diagrams of ranges of the inspection of the back scattering inspection system on the inspected object when the back scattering inspection system are at different positions relative to the inspected object in the embodiment shown in FIG. 2.
Figure 6:
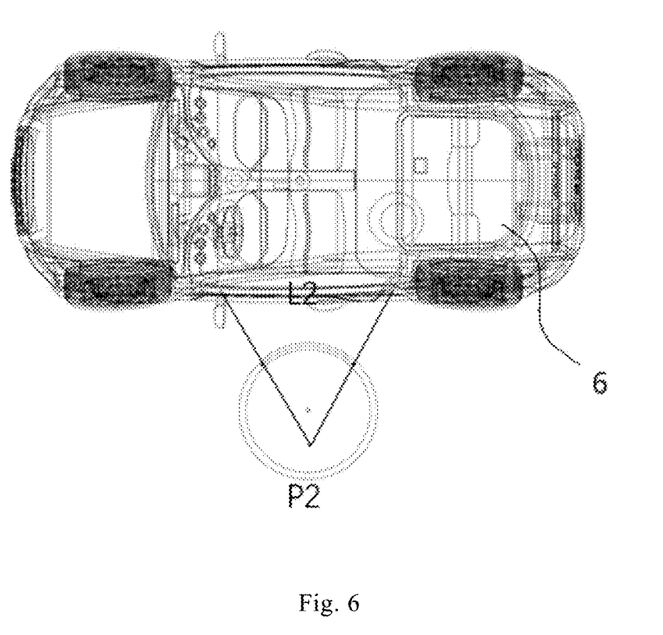
Figure 7:
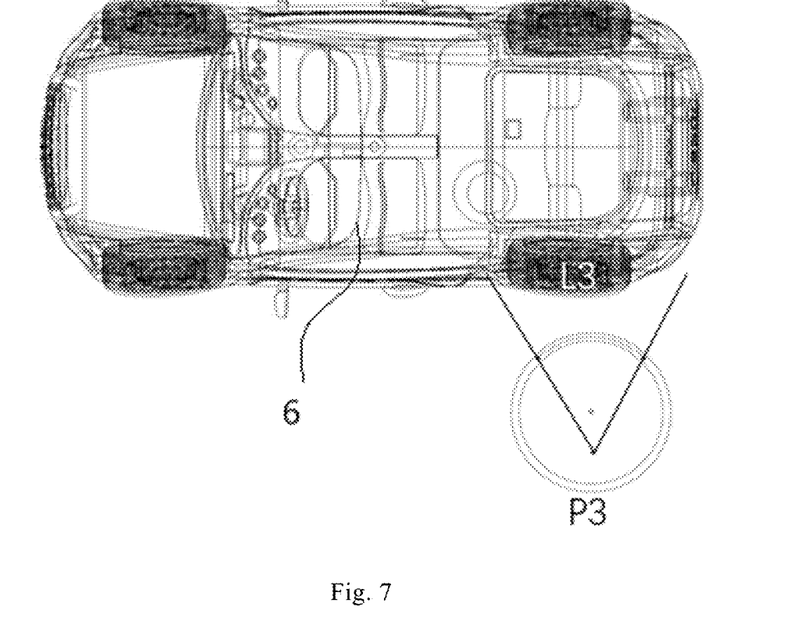

In some embodiments, the frame 1 is a movable frame. As shown in FIG. 5, FIG. 6, and FIG. 7, when the relative positions between the back scattering inspection device 2 and the inspected object 6 in the extension direction of the inspection channel are different, the back scattering inspection ranges of the back scattering inspection device 2 on the inspected object 6 are different.

The shape or structure of the frame 1 is not limited in the present disclosure, for example, the frame 1 can be the track itself, or can include two walking trolleys respectively disposed at two free ends of the U-shaped track.

In FIG. 5, when the vehicle is located in the inspection channel and the back scattering inspection device 2 is at a first position P1 corresponding to the front end of the vehicle, the back scattering ray emitting device 3 is also at the corresponding position, and the length of the back scattering inspection range of the back scattering inspection device 2 on the vehicle is L1. When the back scattering inspection device 2 moves from a position H1 to a position H2 of the frame in FIG. 2, the scanning of the front segment of the vehicle can be competed. In FIG. 6, when the vehicle is located in the inspection channel and the back scattering inspection device 2 is at a second position P2 corresponding to the middle of the vehicle, the back scattering ray emitting device 3 is also at the corresponding position, then the length of the back scattering inspection range of the back scattering inspection device 2 on the vehicle is L2, and when the back scattering inspection device 2 moves from the position H1 to the position H2 of the frame in FIG. 2, the scanning of the middle segment of the vehicle can be competed. In FIG. 7, when the vehicle is located in the inspection channel and the back scattering inspection device 2 is at a third position P3 corresponding to the rear end of the vehicle, the back scattering ray emitting device 3 is also at the corresponding position, then the length of the back scattering inspection range of the back scattering inspection device 2 on the vehicle is L3, and when the back scattering inspection device 2 moves from the position H1 to the position H2 of the frame in FIG. 2, the scanning of the rear segment of the vehicle can be competed.

Figure 8:
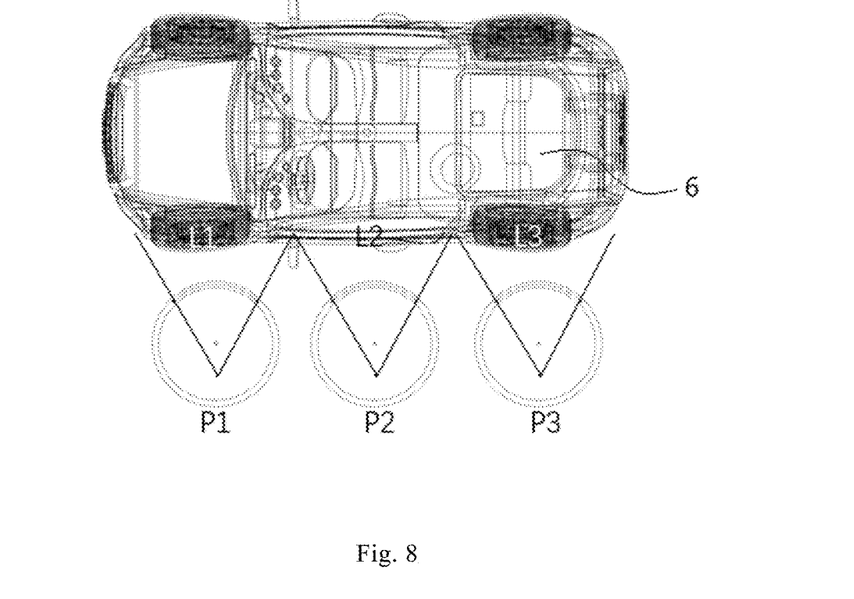
Figure 9:
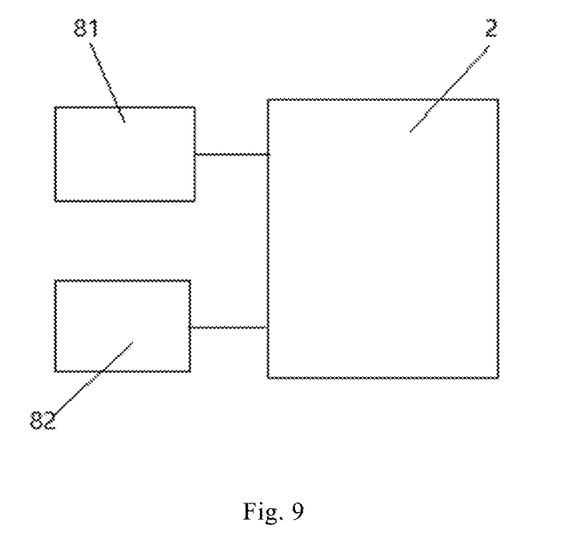
FIG. 9 is a schematic block diagram of a back scattering inspection device connected with a first driving device and a second driving device in some embodiments of the present disclosure.
Figure 10:
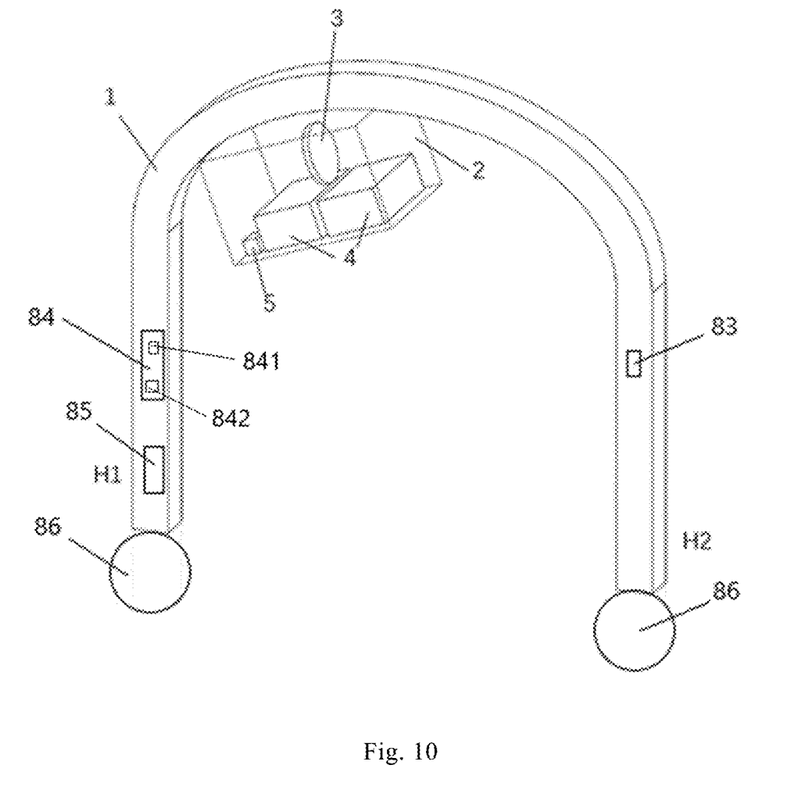
FIG. 10 is a structural schematic diagram of a back scattering inspection system at another inspection state in some embodiments of the present disclosure.

As shown in FIG. 8, if the back scattering inspection system 100 completes the back scattering scanning inspection on the vehicle at the position P1, and then the position of the back scattering inspection system 100 relative to the vehicle is changed to the position P2 to perform the next back scattering scanning inspection, and then the position of the back scattering inspection system 100 relative to the vehicle is changed to the position P3 to perform the next back scattering scanning inspection, as a result, the back scattering inspection system can perform the back scattering scanning inspection on the vehicle over the entire length of the vehicle to obtain a back scattering scanning inspection image on the entire length of the vehicle.

A change of the relative position between the back scattering inspection system 100 and the vehicle can be achieved by moving the vehicle, or by moving the back scattering inspection system. In this embodiment, the frame 1 is set as a movable frame, so that the inspection range of the back scattering inspection system 100 is larger, and at the same time, it helps to make the operation more flexible.

In some embodiments, the back scattering inspection system 100 further includes a positioning sensor 83, configured to detect a position of the inspected object 6 relative to the track. By disposing the positioning sensor 83, it is conducive to determining the position of the track and the back scattering inspection device 1 thereon relative to the inspected object 6, therefore, when a relatively long inspected object 6 is detected, for example, when the inspected object 6 is the vehicle, and when the inspected object 6 needs to be scanned in segments, the relative position between the track and the inspected object can be determined when each segment is scanned. Due to the configuration, when multiple segments of back scattering scanning inspection images obtained by segment scanning are spliced together, it is conducive to making the pixels at the edges of each segment of back scattering scanning inspection image neither overlapped nor disappeared, so that a complete back scattering scanning inspection image of the vehicle is obtained, and the complete back scattering scanning inspection image covers the entire length of the vehicle.

In some embodiments, a roller is 86 installed at the bottom of the frame 1, which can be a track roller, so that the back scattering inspection system 100 can move back and forth on a track. A universal wheel can also be disposed at the bottom of the frame 1, so that the frame 1 can also turn when moving. In this way, the back scattering inspection system 100 can be moved and adjusted more flexibly. During back scattering scanning inspection, the universal wheel can move along optical or magnetic signs on the ground.

In some embodiments, the back scattering inspection system 100 further includes a license plate identification system 85, and when the inspected object 6 is a vehicle, vehicle information identified by the license plate identification system 85 can also be associated with a scanning image obtained by back scattering inspection, facilitating the management and judgment.

In some embodiments, a back scattering inspection method using the back scattering inspection system 100 according to any embodiment is also disclosed, including: when the back scattering inspection device 2 executes scanning inspection, causing the back scattering inspection device 2 to move along the track 104.

In some embodiments, the back scattering inspection method further includes: causing a scanning direction of a pen-shaped ray beam 105 emitted by the back scattering ray emitting device 3 to be parallel to an extension direction of the inspection channel.

In some embodiments, the back scattering inspection method includes: causing the back scattering inspection device 2 to rotate around the direction of the movement of the back scattering inspection device on the track while the back scattering inspection device 2 moves along the track. Due to the configuration, a larger range of inspection on the inspected object can be performed in the case that the frame 1 is fixed.

Figure 14:
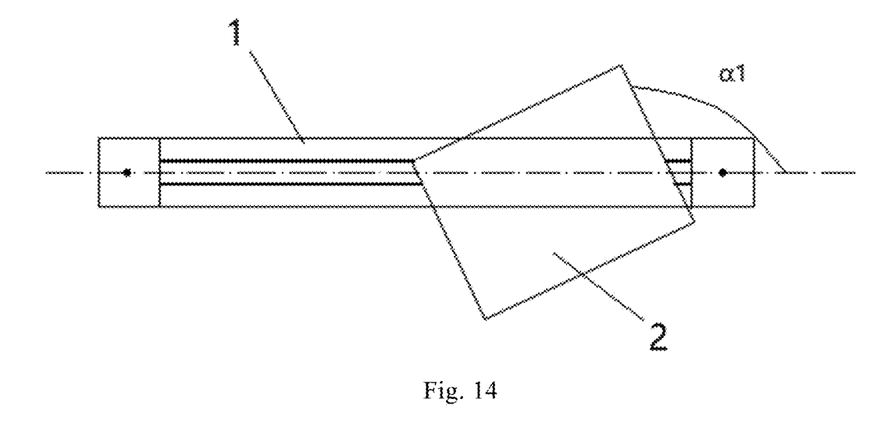
FIG. 14 is a bottom view structural schematic diagram of a back scattering inspection system at another inspection state in some embodiments of the present disclosure.
Figure 15:
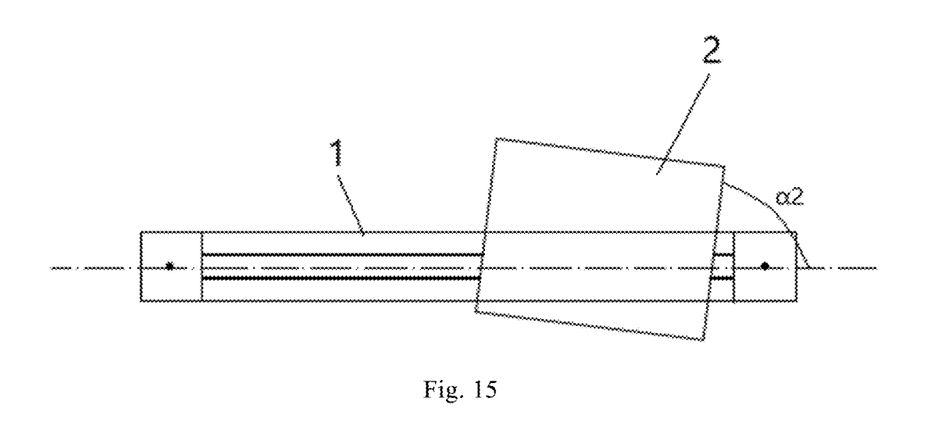
FIG. 15 is a bottom view structural schematic diagram of a back scattering inspection system at another inspection state in some embodiments of the present disclosure.
Figure 16:
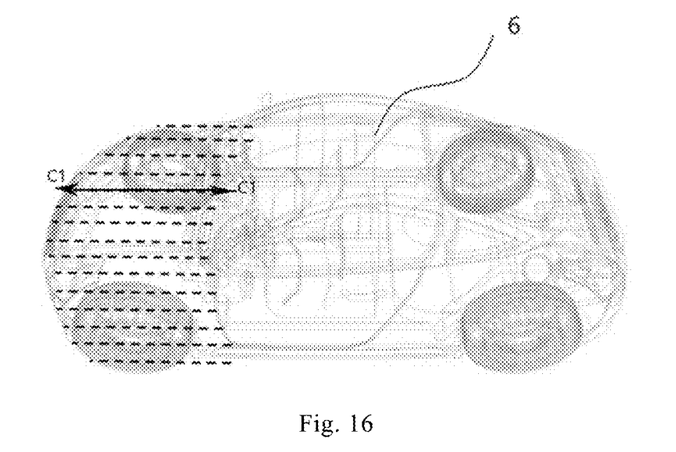
FIG. 16 is a schematic diagram of a scanning direction of a pen-shaped ray beam on the surface of an inspected object in some embodiments of the present disclosure.
Figure 17:
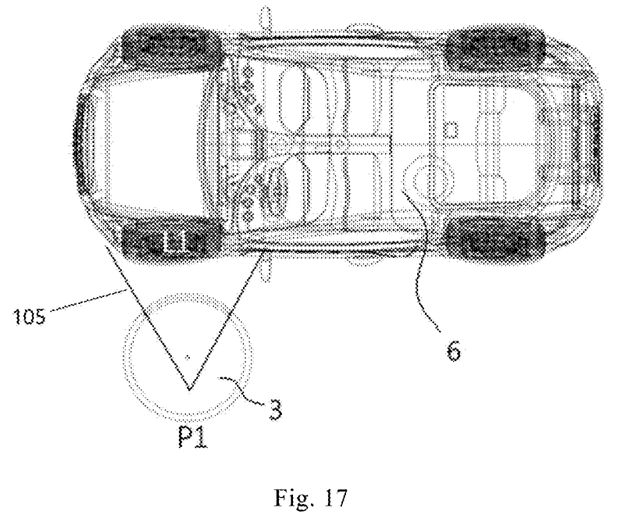
FIG. 17 is a schematic diagram of a range of the inspection of the back scattering inspection system on the inspected object when the back scattering inspection system are at a position relative to the inspected object in some embodiments.

In some embodiments, the back scattering inspection method includes: keeping an angle (a first angle $\alpha 1$ shown in FIG. 14) of the back scattering inspection device 2 around the direction of the movement of the back scattering inspection device on the track unchanged while moving along the track, and performing the next scanning after causing the back scattering inspection device 2 to rotate an angle around the direction of the movement of the back scattering inspection device on the track when the back scattering inspection device 2 moves to a tail end 103 of the track (the first angle is changed to a second angle α2 shown in FIG. 15). Due to the configuration, a larger range of inspection on the inspected object can be performed for multiple times in the case that the frame 1 is fixed.

In some embodiments, the back scattering inspection method further includes: inspecting whether the surface of the object is damaged.

In some embodiments, the back scattering inspection method further includes: detecting the distance between the track and the inspected object 6, and issuing an alarm when the distance between the inspected object and the track is less than a safe distance.

In some embodiments, the back scattering inspection method further includes: after inspecting a part of the inspected object 6 in the extension direction of the inspection channel, changing the position of the inspected object 6 relative to the frame 1 along the extension direction of the inspection channel, and inspecting another part of the inspected object 6.

What is claimed is:

1. An X-ray backscatter inspection system, comprising:
   a frame, comprising a track arranged vertically or obliquely relative to the ground, wherein a space enclosed by the track forms an inspection channel; and
   an X-ray backscatter inspection device, comprising an X-ray emitter and an X-ray backscatter detector, wherein the X-ray backscatter inspection device is movably disposed on the track for inspecting an inspected object passing through the inspection channel;
   a first driving device, in driving connection with the X-ray backscatter inspection device, wherein the first driving device is configured to drive the X-ray backscatter inspection device to move on the track;
   a second driving device, wherein the second driving device is configured to drive the X-ray backscatter inspection device to rotate around a direction of the movement of the X-ray backscatter inspection device on the track.

2. The X-ray backscatter inspection system of claim 1, wherein the X-ray emitter is disposed in such a way that a scanning direction of an X-ray pencil beam emitted by the X-ray emitter is parallel to an extension direction of the inspection channel.

3. The X-ray backscatter inspection system of claim 1, wherein the track is one of a polygonal line-shaped track, a curved track, and a track formed by a combination of a straight track and a curved track.

4. The X-ray backscatter inspection system of claim 3, wherein the track is one of a U-shaped track, an arc-shaped track, and a circular track.

5. The X-ray backscatter inspection system of claim 1, further comprising a license plate identification system, wherein when the inspected object is a vehicle, a license plate recognition system is configured to identify license plate information of the vehicle.

6. The X-ray backscatter inspection system of claim 1, further comprising a positioning sensor, configured to detect a position of the inspected object relative to the track.

7. The X-ray backscatter inspection system of claim 1, further comprising a laser radar device, configured to inspect a surface of the inspected object.

8. The X-ray backscatter inspection system of claim 1, further comprising an anti-collision system, wherein the anti-collision system comprises an anti-collision sensor disposed on the frame for detecting a distance between the track and the inspected object, and an alarm system in signal connection with the anti-collision sensor.

9. The X-ray backscatter inspection system of claim 1, wherein the frame is a movable frame and a roller is installed at a bottom of the frame.

10. An X-ray backscatter inspection method using an X-ray backscatter inspection system, comprising:
    Providing a frame that comprises a track and arranging the track vertically or obliquely relative to the ground to enclose a space therein to form an inspection channel;
    movably disposing an X-ray backscatter inspection device in a manner that allows said X-ray backscatter inspection device to move along said track, wherein said X-ray backscatter inspection device comprises an X-ray emitter and an X-ray backscatter detector;
    using a first driving device to move the X-ray backscatter inspection device along the track and using a second driving device to rotate the X-ray backscatter inspection device around the direction of the movement of the X-ray backscatter inspection device on the track to cause the X-ray backscatter inspection device to execute scanning inspection while causing an inspected object to be passing through the inspection channel.

11. The X-ray backscatter inspection method of claim 10, wherein a scanning direction of an X-ray pencil beam emitted by the X-ray emitter is parallel to an extension direction of the inspection channel.

12. The X-ray backscatter inspection method of claim 10, further comprising: causing the X-ray backscatter inspection device to rotate around the direction of the movement of the X-ray backscatter inspection device on the track when the X-ray backscatter inspection device moves along the track.

13. The X-ray backscatter inspection method of claim 10, further comprising: using the second driving device to keep a first angle of the X-ray backscatter inspection device unchanged during movement of the X-ray backscatter inspection device on the track, said first angle being an angle of the X-ray backscatter inspection device around a direction of the movement of the X-ray backscatter inspection device; using the second driving device to rotate the X-ray backscatter inspection device by an angle to change the first angle to a second angle as the X-ray backscatter inspection device reaches a tail end of the track, said second angle being an angle of the X-ray inspection backscatter device around the direction of the movement of the X-ray backscatter inspection device different from the first angle; and performing a next scanning, wherein the X-ray backscatter inspection device moves from the tail end of the track to another end of the track.

14. The X-ray backscatter inspection method of claim 10, further comprising: using a laser radar device to inspect whether a surface of the object is damaged.

15. The X-ray backscatter inspection method of claim 10, further comprising: using an anti-collision sensor to detect the distance between the track and the inspected object, and causing an alarm system in signal connection with the anti-collision sensor to issue an alarm when the distance between the inspected object and the track is less than a safe distance.

16. The X-ray backscatter inspection method of claim 10, further comprising: after inspecting a part of the inspected object in an extension direction of the inspection channel, changing the position of the inspected object relative to the frame along the extension direction of the inspection channel, and inspecting another part of the inspected object.

\* \* \* \* \*